United States Patent
Hara et al.

(10) Patent No.: US 7,131,130 B2
(45) Date of Patent: Oct. 31, 2006

(54) PICKUP MOUNTING STRUCTURE WITH PICKUP CABLE HOLDER BRIDGING PERIPHERY-RIBBED OPENING

(75) Inventors: Hirotoshi Hara, Takefu (JP); Yoshiharu Kagawa, Takefu (JP); Shinji Mitamura, Takefu (JP)

(73) Assignee: Orion Electric Co., Ltd., Takefu (JP)

( * ) Notice: Subject to any disclaimer, the term of this patent is extended or adjusted under 35 U.S.C. 154(b) by 345 days.

(21) Appl. No.: 10/773,071

(22) Filed: Feb. 5, 2004

(65) Prior Publication Data

US 2004/0163095 A1 Aug. 19, 2004

(30) Foreign Application Priority Data

Feb. 7, 2003 (JP) ............................. 2003-030201

(51) Int. Cl.
G11B 7/08 (2006.01)
H05K 7/14 (2006.01)
(52) U.S. Cl. ...................................... 720/689; 720/663
(58) Field of Classification Search ................ 720/689, 720/692, 676, 677, 663
See application file for complete search history.

(56) References Cited

FOREIGN PATENT DOCUMENTS

JP 10-256759 9/1998

OTHER PUBLICATIONS

Translation of JP 10-256759 A, Tatsuyuki Nakayama, Sony Corp., Sep. 25, 1998.*

* cited by examiner

*Primary Examiner*—Craig A. Renner
(74) *Attorney, Agent, or Firm*—Flynn, Thiel, Boutell & Tanis, P.C.

(57) ABSTRACT

The invention is a pickup mounting structure capable of executing with precision, positioning and moving position control of a pickup mounted on a base plate member, even if the thickness of the base plate member is rendered smaller. With the pickup mounting structure, a substantially rectangular opening is provided in the central part of a base plate member made of metal, and a rib is formed around the entire periphery of the opening. A holder formed integrally with the rib is provided in the central part of the opening so as to bridge across the opening, and a cable fixture member made of a synthetic resin is fitted to a flat plate part of the holder, which is rectangular. The cable fixture member is provided with pawls in such a way as to be protruded therefrom, and a cable bent substantially at a right angle is fitted among the pawls.

5 Claims, 3 Drawing Sheets

PICKUP MOUNTING STRUCTURE WITH PICKUP CABLE HOLDER BRIDGING PERIPHERY-RIBBED OPENING

FIELD OF THE INVENTION

The present invention relates to a pickup mounting structure of a disk drive for CDs, DVDs, and so forth.

BACKGROUND OF THE INVENTION

With a disk drive for CDs, DVDs, and so forth, while rotating an information recording disc at a high speed, a pickup is moved over a recording surface of the disc to thereby read information, however, in order to read the information recording disc with information recorded at a high density, positioning control of the pickup needs to be executed with precision. For this purpose, a rotating drive of the information recording disc and the pickup are mounted on a base plate member made of metal to enable the positioning of the pickup to be implemented with accuracy. Further, a movement controller for moving the pickup is also mounted on the same base plate member in an attempt to achieve precise control of a reading position of the pickup. Further, a holder of a wiring cable connected to the pickup is provided on the base plate member, so that the wiring cable is held by the holder once before taken out to the outside so as not interfere with movement of the pickup.

With reference to the disk drive described above, there have recently been proposed various improvements on a mounting structure for the pickup described, and so forth. For example, in Patent Document 1 of JP-A10-256759, there is described that a cable fixture unit made up of a mount protruded in the shape of a square in a depression of a chassis, and pawls provided in the mount is formed as a fixture structure of a flexible flat cable connected to a pickup.

With the disk drive described above, there have so far existed technical requirements for lighter weight and reduction in thickness, and from such a point of view, improvements are desired of a mounting structure of the pickup as well. From the viewpoint of reduction in weight, there occurs an idea of reducing the thickness of the base plate member made of metal, however, reduction in thickness will cause the base plate member to become susceptible to bending, raising the risk of precise positioning of the rotating drive of the disc and the pickup, mounted on the base plate member, becoming difficult to implement. Further, for example, as in Patent Document 1, if the base plate member is worked on to be formed into a complex shape provided with the depression, the cable fixture unit, and so forth, there is the risk of occurrence of troubles such as cracks occurring to worked parts of the base plate member unless it has a thickness of a certain magnitude.

SUMMARY OF THE INVENTION

It is therefore an object of the invention to provide a pickup mounting structure capable of executing with precision positioning and moving position control of a pickup mounted on a base plate member even if the thickness of the base plate member is rendered smaller, and further, capable of easily forming a holder for reliably holding a wiring cable connected to the pickup.

To that end, the present invention provides in its first aspect a pickup mounting structure having a base plate member made of metal, provided with an opening formed in the central part thereof, substantially rectangular in shape, a pair of guide members set up so as to be parallel with each other with the opening sandwiched therebetween and each having both ends thereof, fixedly attached to one face of the base plate member, and a pickup slidably fitted to the guide members and movable inside the opening, wherein the pickup mounting structure comprises a rib integrally formed on the other face of the base plate member, in such a way as to be protruded around the periphery of the opening, and a holder for holding a wiring cable connected to the pickup, formed integrally with the rib so as to bridge across the opening. Preferably, the rib is formed so as to be protruded around the entire periphery of the opening. Further, a wiring cable fixture member made of a synthetic resin may be fitted to the holder. Still further, the wiring cable fixture member may be fitted to the holder by means of the outsert-molding. Further, with these features, a plurality of pawls are preferably formed at respective positions of the wiring cable fixture member, on both sides of the wiring cable, so as to be protruded, for holding a bent portion of the wiring cable. Furthermore, preferably, the wiring cable fixture member has a depression formed in a face thereof, corresponding to an overlapped portion of the wiring cable and the pawls are formed at respective positions on both sides of a portion of the wiring cable, extending from the overlapped portion while a curvature is formed on the face thereof, corresponding to the overlapped portion of the wiring cable, so as to be higher in profile than the depression.

With the invention having such a configuration as described above, since the opening is provided in the base plate member, reduction in weight can be achieved and since the rib is formed around the entire periphery of the opening, the strength of the base plate member can be enhanced, thereby preventing bending and so forth from occurring thereto. Further, the pickup is rendered movable within an opening range of the opening, thereby achieving further reduction in the thickness of the pickup mounting structure in whole. Still further, since the respective guide members of the pickup mounting structure have both ends fixedly attached to the base plate member, and are disposed with the opening sandwiched therebetween, the strength of portions of the base plate member, around the periphery of the opening, can be enhanced by the rib, thereby enabling positioning of the guides to be accurately executed, so that position control of the pickup can be executed with precision. Further, the rib is provided with the holder of the wiring cable so as to bridge across the opening, so that the strength of the base plate member can be enhanced, and as the holder is formed integrally with the rib, molding in one piece can be applied with ease.

Furthermore, as the wiring cable fixture member made of the synthetic resin is fitted to the holder, mounting operation can be executed without causing the wiring cable to be marred. More specifically, in the case where the pawls and so forth are formed on the holder itself, and the wiring cable is fitted thereto, if the holder is formed of a metal, this has raised the risk of the wiring cable being marred upon the wiring cable coming in contact with the pawls. In the case of the cable fixture member made of the synthetic resin, however, such a problem does not occur. Further, complex working is required for forming the pawls on the holder itself, and the holder itself is required to have a thickness of a certain magnitude, however, if the wiring cable fixture member made of the synthetic resin, prepared separately, is fitted to the holder, such complex working is unnecessary, and the thickness of the holder itself can be reduced. Then, by fitting the wiring cable fixture member made of the synthetic resin to the holder by means of the outsert-molding, such fitting can be achieved with ease.

Furthermore, by forming the depression in the face of the wiring cable fixture member, corresponding to the overlapped portion of the wiring cable, in order to hold the bent portion of the wiring cable, insertion of the overlapped portion of the wiring cable can be implemented with ease while by forming the pawls at respective positions on both sides of the portion of the wiring cable, extending from the overlapped portion, and by forming the curvature on the face corresponding to the overlapped portion of the wiring cable, so as to be higher in profile than the depression, the wiring cable is rendered less prone to be disengaged. Further, the depression herein includes a case where a portion of the holder is exposed (a condition where the wiring cable fixture member is notched).

PREFERRED EMBODIMENT OF THE INVENTION

Figure 1:
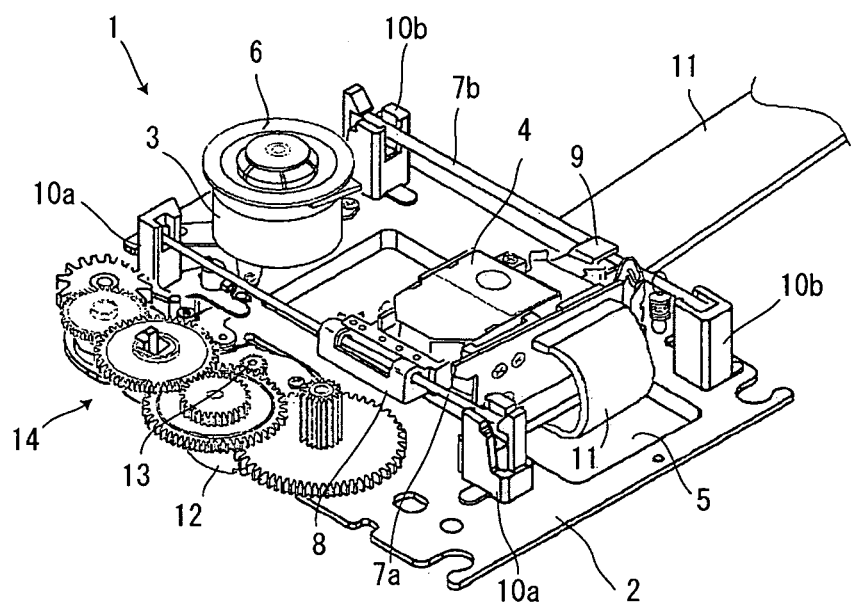
FIG. 1 is a schematic perspective view of an embodiment of a pickup mounting structure according to the invention, as seen from one side thereof.
Figure 2:
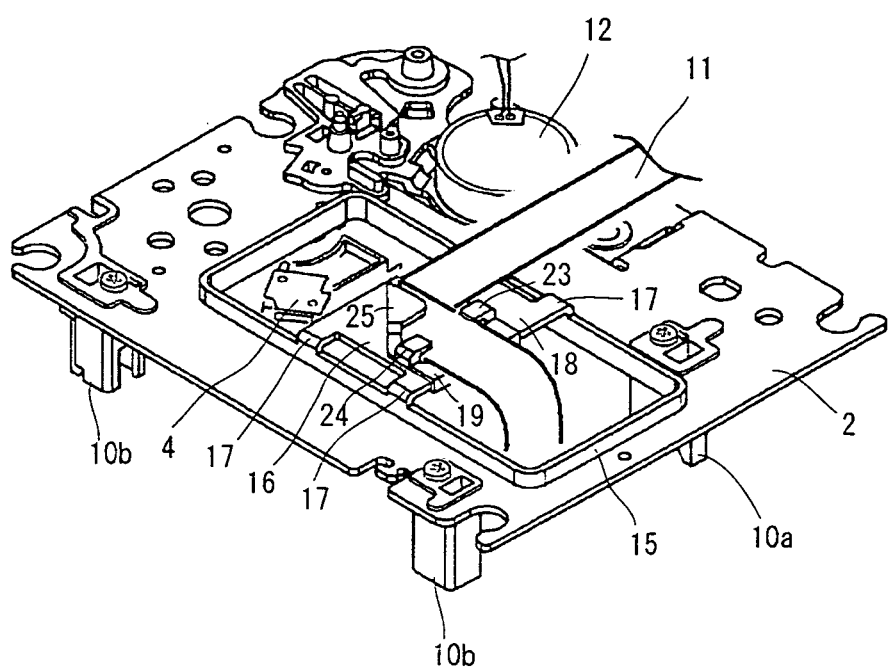
FIG. 2 is a schematic perspective view of the pickup mounting structure, as seen from the other side thereof.

A preferred embodiment of the invention is described in detail hereinafter. FIG. 1 is a schematic perspective view of an embodiment of a pickup mounting structure according to the invention, showing a side thereof where a pickup is mounted thereon. FIG. 2 is a schematic perspective view of the pickup mounting structure, as seen from a side opposite from the side shown in FIG. 1, showing a side thereof where a holder of a wiring cable connected to the pickup is formed.

As shown in FIG. 1, a mounting structure 1 has a spindle motor 3 for rotating a disc, and guides 7a, 7b, in rail-like shape, for guiding a pickup 4 in a predetermined direction, mounted on one face of a base plate 2 made of metal, rectangular in shape. The base plate 2 has a plurality of mounting holes provided as necessary for mounting these components thereon. In particular, in the central part of the base plate 2, there is provided an opening 5 substantially rectangular in shape. The spindle motor 3 has its bottom face fixedly attached onto the base plate 2 with screws and, on the upper face of the spindle motor 3, a turntable 6 with the disc mounted thereon is fixedly attached to a rotating spindle of the spindle motor 3.

On both sides of the pickup 4, there are provided an insertion-through part 8 for allowing the guide 7a to be inserted therethrough, and a fit part 9 for allowing the guide 7b to fit thereto, respectively, and the guides 7a, 7b each have both ends thereof fitted into guide support members 10a, 10a, and 10b, 10b, respectively, and are disposed along respective sides of the opening 5. Further, the pickup 4 is so designed as to be able to move in a direction toward the turntable 6 within an opening range of the opening 5 to thereby read information recorded in the underside face of the disc mounted on the turntable 6. A flexible flat cable 11 (referred to hereinafter merely as a "cable"), as a wiring cable connected to the pickup 4, is fitted thereto. The cable 11 is connected to a side of the pickup 4, and is attached in a bent condition to a holder disposed underneath the pickup 4 as described later so as to be externally extended for connection with a controller (not shown). A feed motor 12 is fixedly attached to a side part of the base plate 2 for controlling the position of the pickup 4, and rotational driving by the feed motor 12 is transmitted to a gear drive mechanism 14 via a drive gear 13. The gear drive mechanism 14 is connected to a public known rack mechanism (not shown) mounted on the insertion-through part 8 of the pickup 4 and is capable of moving the pickup 4 to a predetermined position by rotation of the feed motor 12.

As shown in FIG. 2, a rib 15 of a predetermined width is integrally formed around the entire periphery of the opening 5 in such a way as to be protruded from the base plate 2. Further, the holder 16 for holding the cable 11 is integrally attached to the rib 15 substantially at the central part of the opening 5. With the holder 16, a flat plate part 18, rectangular in shape, is attached to the rib 15 with an attachment leg 17 formed in four corners of the holder 16, respectively.

Because the rib 15 is integrally formed around the entire periphery of the opening 5, strength of the base plate 2 in whole can be enhanced and it is also possible to accurately execute positioning of the guide support members 10a, and 10b, to be fixedly attached to the base plate 2 so as to surround the opening 5, thereby enabling the position of the pickup 4 to be controlled by the guides 7a, 7b with precision. Furthermore, since the holder 16 is integrally formed with the rib 15, strength of the periphery of the opening 5 is enhanced. In addition, if the attachment legs 17 are formed from the rib 15 without bending the same, machining of the holder 16 can be facilitated.

Figure 3:
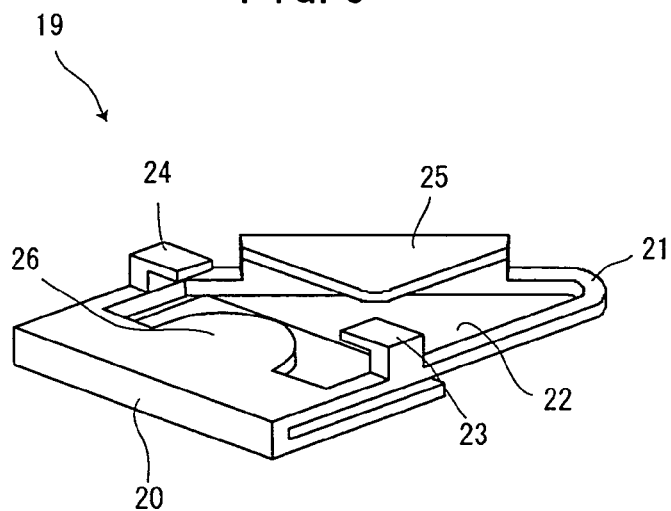
FIG. 3 is a schematic perspective view of a wiring cable fixture member according to the embodiment of the invention.
Figure 4A:
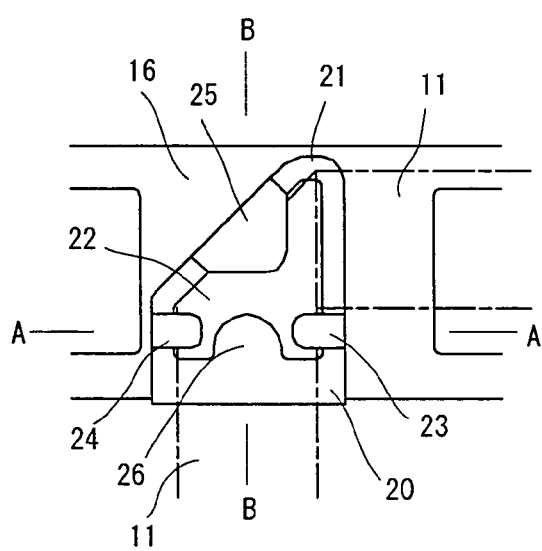
FIGS. 4(A), 4(B), and 4(C) are a pan view, an elevation, and a side view of the wiring cable fixture member according to the embodiment.

A cable fixture member 19 made of a synthetic resin for attaching a bent part of the cable 11 thereto is fitted to the flat plate part 18. As shown in a perspective view of FIG. 3, in the cable fixture member 19, a framed part 21 extended along the flat plate part 18 is integrally formed with an attachment base body 20 substantially in the shape of an angular U. As shown in a plan view of FIG. 4(A), the framed part 21 is substantially in the shape of a triangle formed along a part (a dash and dotted line) of the cable 11, bent substantially at a right angle, and a depression 22 exposing a portion of the surface of the flat plate part 18 is formed in a surrounded portion of the framed part 21. In this connection, the depression 22 may be formed without exposing the portion of the flat plate part 18, in which case the cable fixture member 19 may be provided with a stepped part.

Figure 4C:
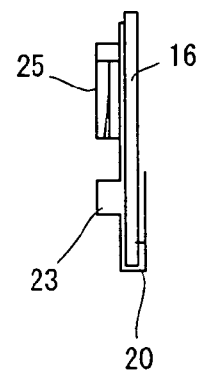
Figure 4B:
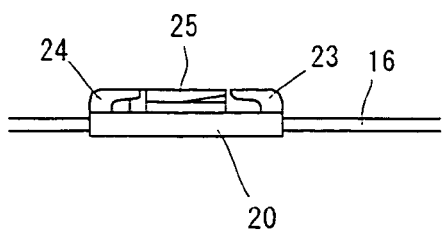

The framed part 21 is provided with pawls 23, 24, 25, in such a way as to be protruded therefrom. The pawls 23, 24 are disposed in the vicinity of a connection between the framed part 21 and the attachment base body 20 while the pawl 25 is disposed in a part of the framed part 21, along a slant side thereof, opposite from the part of the cable 11, bent substantially at a right angle. As shown in an elevation of FIG. 4(B) as seen in a direction from the lower side in the plane of FIG. 4(A), the pawls 23, 24 has a plate-like retainer in spacing formed between the upper face of the attachment base body 20 and the pawls 23, 24, respectively, with an interval substantially equivalent to a thickness of the cable 11. Further, as shown in a side view of FIG. 4(C) as seen in a direction toward the left-hand side in the plane of FIG. 4(A), the pawl 25 has a plate-like retainer in spacing formed between the bottom face of the depression 22 and the pawl 25 with an interval substantially equivalent to twice the thickness of the cable 11. Then, a side face of the pawls 23, 24, respectively, on a side thereof, facing the pawl 25, is formed in a straight line along a side face of the cable 11 inserted from a right-hand direction in the plane of the figure. Further, an interval between respective root parts of the pawls 23, 24, attached to the framed part 21, is set so as to be substantially equal to a length of the cable 11, widthwise.

The attachment base body 20 is provided with a curvature 26 formed between the pawls 23, 24 to be extended so as to be protruded toward the framed part 21, having a thickness equal to that of other parts of attachment base body 20. The curvature 26 is extended as far as the tip thereof is aligned with the side face of the pawls 23, 24, respectively, on the side thereof, facing the pawl 25.

Figure 5:
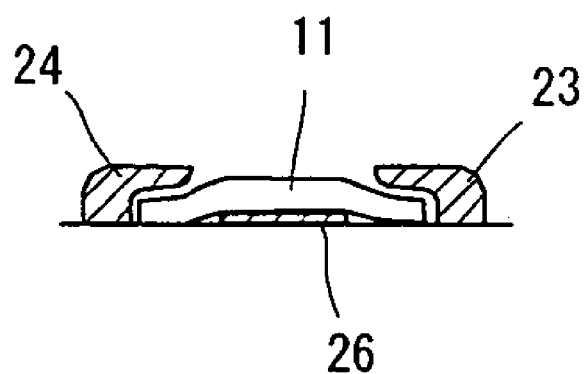
FIG. 5 is a sectional view taken on line A—A in FIG. 4(A)
Figure 6:
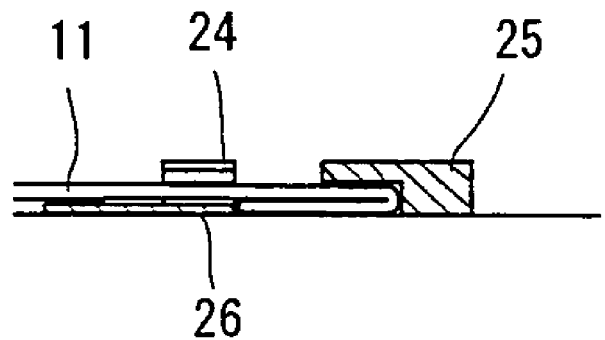
FIG. 6 is a sectional view taken on line B—B in FIG. 4(A).

As shown in FIG. 2, the cable 11 is inserted from the pickup 4 in-between the pawls 23, 24 in such a way as to be bent in a shape resembling the letter U. As described, since the interval between the pawls 23, 24 is set so as to be substantially equal to the length of the cable 11, widthwise, and the curvature 26 is formed between the pawls 23, 24, the cable 11 between the pawls 23, 24 is in a slightly sagged condition, which is shown in FIG. 5, a sectional view taken on line A—A in FIG. 4(A). The cable 11 passes between the pawls 23, 24, and subsequently, is bent at fold line at 45 degrees toward the flat plate part 18 (toward a depth direction in the plane of the figure) to be thereby extended substantially in an orthogonal direction (in a direction toward the right in the plane of the figure), so that an overlapped portion of the cable 11 after bent will fit just into the depression 22. Such a condition is shown in FIG. 6, a sectional view taken on line B—B in FIG. 4(A). As is evident from FIG. 6, because the interval between the pawl 25 and the depression 22 is about twice as large as the thickness of the cable 11, the upper face of the cable 11 on the upper side of the overlapped portion thereof is retained by the retainer of the pawl 25 while a side face of the cable 11 on the underside of the overlapped portion thereof is restrained by the tip of the curvature 26 and the side face of the pawl 23, on the side thereof, facing the pawl 25.

As described in the foregoing, since the cable 11 is held by the cable fixture member 19, move of the cable 11 in the vertical direction in the plane of the figure is restrained by the pawls 25 and 23 while the move thereof in the lateral direction in the plane of the figure is restrained by the pawls 23 and 24. Further, the cable 11 is held in the sagged condition by the curvature 26 while the tip of the curvature 26 is butted against the side face of the cable 11, so that rattling of the cable 11 can be suppressed.

In the case of fitting the cable 11 into the cable fixture member 19, it need only be sufficient to fit the cable 11 in a condition as-bent substantially at a right angle into the cable fixture member 19 such that the side face thereof is butted against the pawls 24 and 25 to be subsequently fitted to the pawl 23 while bending the cable 11 widthwise. Thus fitting of the cable 11 can be executed with ease.

In addition, since the cable fixture member 19 is made of the synthetic resin, even if the pawls and so forth come into contact with the cable 11, this will not cause the cable 11 to be marred, and at the same time, molding for working thereon can be performed with ease. By forming the cable fixture member 19 on the flat plate part 18 by the outsert-molding method, in particular, the same can be formed efficiently.

With the embodiment of the invention described above, there has been described a case where the pawls, three in number, are provided by way of example, however, a pawl part may be made up by integrating the pawl 24 with the pawl 25. Thus it is to be pointed out that the invention is not limited to the embodiment described.

What is claimed is:

1. A pickup mounting structure having a base plate member made of metal, provided with an opening substantially rectangular in shape, formed in the central part of the base plate member, a pair of guide members set up so as to be parallel with each other with the opening sandwiched therebetween and each having both ends thereof fixedly attached to one face of the base plate member, and a pickup slidably fitted to the guide members and movable inside the opening; said pickup mounting structure additionally comprising:
   a rib integrally formed on the opposite face of the base plate member in such a way as to protrude around the entire periphery of the opening; and
   a holder for holding a wiring cable connected to the pickup and formed integrally with the rib so as to bridge across the opening.

2. A pickup mounting structure according to claim 1, wherein a wiring cable fixture member made of a synthetic resin is fitted to the holder.

3. A pickup mounting structure according to claim 2, wherein a plurality of pawls are formed at respective positions of the wiring cable fixture member, on both sides of the wiring cable, so as to be protruded, for holding a bent portion of the wiring cable.

4. A pickup mounting structure according to claim 2, wherein the wiring cable fixture member is fitted to the holder by means of an outsert-molding.

5. A pickup mounting structure having a base plate member made of metal, provided with an opening substantially rectangular in shape, formed in the central part of the base plate member, a pair of guide members set up so as to be parallel with each other with the opening sandwiched therebetween and each having both ends thereof fixedly attached to one face of the base plate member, and a pickup slidably fitted to the guide members and movable inside the opening; said pickup mounting structure comprising:
   a rib integrally formed on the other face of the base plate member in such a way as to protrude around the periphery of the opening; and
   a holder, to which a wiring cable fixture member made of a synthetic resin is fitted, for holding a wiring cable connected to the pickup and formed integrally with the rib so as to bridge across the opening;
   wherein the wiring cable fixture member has a plurality of pawls formed at respective positions thereof on both sides of the wiring cable, so as to protrude therefrom and hold a bent portion of the wiring cable, and also has a depression formed in a face thereof corresponding to an overlapped portion of the wiring cable and the pawls are formed at respective positions on both sides of a portion of the wiring cable, extending from the overlapped portion, while a curvature is formed on the face thereof, corresponding to the overlapped portion of the wiring cable, so as to be higher in profile than the depression.

* * * * *